United States Patent [19]

Nobori

[11] Patent Number: 5,647,401
[45] Date of Patent: Jul. 15, 1997

[54] REINFORCING-THREAD-BURIED RESIN PIPE

[75] Inventor: Masakatsu Nobori, Osaka, Japan

[73] Assignee: Totaku Industries, Inc., Osaka, Japan

[21] Appl. No.: 573,130

[22] Filed: Dec. 15, 1995

[30] Foreign Application Priority Data

Dec. 20, 1994 [JP] Japan ............... 6-335502

[51] Int. Cl.⁶ ............... F16L 11/08; F16L 55/00
[52] U.S. Cl. ............... 138/126; 138/104; 138/123; 40/316; 116/200
[58] Field of Search ............... 138/123–126, 138/104; 40/316; 116/200, DIG. 21

[56] References Cited

U.S. PATENT DOCUMENTS

| | | | |
|---|---|---|---|
| 951,147 | 3/1910 | Porter | 40/316 X |
| 1,632,030 | 6/1927 | Martin | 40/316 X |
| 2,106,048 | 1/1938 | Candy, Jr. | 40/316 X |
| 2,220,895 | 11/1940 | Epstein | 116/200 X |
| 2,705,735 | 4/1955 | Wolf | 40/316 X |
| 2,870,619 | 1/1959 | Greczin | 138/123 X |
| 3,020,335 | 2/1962 | Gillis | 40/316 X |
| 4,128,736 | 12/1978 | Nutt et al. | 40/316 X |
| 4,336,087 | 6/1982 | Martuch et al. | 40/316 X |
| 4,474,217 | 10/1984 | DeMarse et al. | 138/104 X |
| 4,699,838 | 10/1987 | Gilbert | 138/104 X |
| 5,111,605 | 5/1992 | Bossi | 138/104 X |
| 5,182,954 | 2/1993 | Menheere | 138/104 X |
| 5,228,478 | 7/1993 | Kleisle | 138/104 |
| 5,555,913 | 9/1996 | Waidele et al. | 138/104 |

Primary Examiner—Patrick Brinson
Attorney, Agent, or Firm—Whitham, Curtis, Whitham & McGinn

[57] ABSTRACT

A reinforcing-thread-buried resin pipe has a structure in which, by using a device of burying reinforcing threads, one or more reinforcing threads different in color from a number of reinforcing threads are mixed in the reinforcing threads or one or more filaments different in color from a number of reinforcing threads are mixed in the reinforcing threads.

20 Claims, 3 Drawing Sheets

REINFORCING-THREAD-BURIED RESIN PIPE

BACKGROUND OF THE INVENTION

The present invention relates to a resin pipe (including hose) which is formed of a resin material such as rubber, synthetic rubber, synthetic resin, or the like, and in which a number of reinforcing threads are buried in the pipe wall. More particularly, the present invention relates to a resin pipe in which a pipe wall is formed so as to have two or more layers and a number of reinforcing threads are buried between the layers.

Conventionally, a synthetic resin pipe in which a number of reinforcing threads are buried in the pipe wall, is generally known. Further, a pipe in which such reinforcing threads are buried in the pipe wall along the length thereof, and a pipe in which such reinforcing threads are buried so as to cross each other along the obliquely circumferential directions of the pipe wall, are generally known.

In those conventional synthetic resin pipes, regardless of the method of thread arrangement employed in the respective synthetic resin pipes, one kind of reinforcing threads, that is, reinforcing threads of one kind of color, are buried in one pipe. This is because reinforcing threads are buried only for the purpose of reinforcing a pipe wall. Therefore, only one kind of reinforcing threads are sufficient to attain such a purpose of reinforcement. In this point, there is no special problem.

In such a reinforcing-thread-buried resin pipe, however, in order to make indication as to the machine and factory by which and in which the pipe is produced respectively, it is necessary to give an indication by making printing on the pipe when the pipe is produced.

As means for performing such printing, it is possible to consider two kinds of means, that is, means using ink and means for giving baking indication. In the case of using ink, there are various problems that the ink spread property is poor because the object to be printed is resin, the ink may become dirty if the other thing touches the ink before it has been dried completely, the ink is apt to be erased by being touched by other things even after dried, and so on, while, in the case of baking printing, it is difficult to give clear indication, the surface of the pipe is apt to be injured, it is difficult to see the indication, and so on.

Further, in either case of foregoing conventional printing means, there are various problems that printing cannot be carried out surely because the printing surface is curved and this curved surface varies in accordance with the diameter of the pipe. Also, additional labor for printing is required in addition to the pipe producing process. The indication cannot be recognized in a portion between the printed portions even if printing is performed at predetermined intervals. The reduction of printed intervals brings about an increase of the cost. Positioning of printing is difficult and displacement in timing is apt to occur in the case of a pipe having a corrugate outer circumferential surface because the printing position is limited.

SUMMARY OF THE INVENTION

In view of the aforementioned various problems in such a resin pipe in which a number of reinforcing threads are buried in its pipe wall, the present invention is intended to provide a resin pipe in which all the aforementioned problems in the conventional resin pipe can be solved. That is, it is an object of the present invention to provide a reinforcing-thread-buried resin pipe in which the printing means having the aforementioned various problems is not used, and the machine which produced the reinforcing-thread-buried resin pipe, the date on which the reinforcing-thread-buried resin pipe was produced, etc. can be recognized in any place of the reinforcing-thread-buried resin pipe without using any other step in place of the printing means.

In order to attain the above object, and in order to solve the above problems, the first configuration of the resin pipe according to the present invention is such that a number of reinforcing threads buried in a pipe wall include general reinforcing threads and one or more reinforcing threads which are different in color from the general reinforcing threads and mixed in the general reinforcing threads. The second configuration is such that one or more filaments different in color from a number of reinforcing threads are mixed in the number of reinforcing threads partly between layers of the pipe wall.

The present invention may be carried out to provide a reinforcing-thread-buried resin pipe in which either of or both of reinforcing threads and filaments different in color are buried. Further, even in the case where the reinforcing threads are identical in color with the general reinforcing threads, thread/threads different in color from the reinforcing threads may be mixed into or twisted with the reinforcing threads, or threads such as filaments different in color from the reinforcing threads may be arranged along with or separately from the reinforcing threads.

For example, only one colored thread is used, and by changing the color of this colored thread, it is possible to indicate the machine which produced the pipe, or the date on which the pipe was produced. Further, by using only one thread in which a thread of a certain color and another thread of another color are combined or twisted, it is possible to indicate the machine and year of production, or the year and month of production. Further, not only the selected color of the thread, but also the thread arrangement interval may be used such that the thread arrangement interval is suitably set or the thread color and the thread arrangement interval are variously combined to thereby make it possible to recognize the various kinds of facts such as the source of the pipe, the date of production of the pipe, and so on.

The pipe wall is not limited to have two layers of outer and inner ones, but it is realized to have three or more layers. The outer layer covering the outer circumferential surface of the reinforcing threads may be formed of transparent resin so that the reinforcing threads can be seen through the outer layer from the outside. Alternatively, the pipe may be realized so as to have a pipe wall the whole of which is formed from a transparent resin. The pipe may be realized so as to have any shape of the pipe wall in a manner such that the whole surfaces of the pipe wall, that is, both the outer and inner circumferential cylindrical surfaces of the pipe wall may be made flat, corrugate such as annularly corrugate, spirally corrugate, or the like; only the inner circumferential surface is made flat-cylindrical while the outer circumferential surface is made corruate, and so on.

As the material forming the pipe wall, any material such as rubber, synthetic rubber, synthetic resin, or the like, may be used taking the place of use of the pipe, the purpose of use of the pipe, the size of the pipe, the pressure resistance, the flexibility, etc., into consideration. In the case of a flexible pipe with its pipe wall formed of a soft material, the present invention may be carried out to provide such a flexible pipe in which reinforcing wires or ribs of hard material are formed on the outer circumferential surface of the pipe wall, between the layers of the pipe wall, or on the inner circumferential surface of the pipe wall 1.

In the thus configured resin pipe according to the present invention, the pipe wall is reinforced by the reinforcing threads. Since a part of the reinforcing threads is different in color from the remaining reinforcing threads, or filament different in color from the reinforcing threads are buried, if the color or order of thread arrangement of these reinforcing threads or filaments, or the positional relation of thread arrangement of these reinforcing threads or filaments relative to the general reinforcing threads are changed, the machine by which the pipe is produced, the date of production of the pipe, and so on, can be easily recognized through inspection of the colors of the threads or the relation of thread arrangement which appear on a cross section when the pipe is cut off even in any position thereof. In the case where the outer layer of the pipe wall 1 is formed from a transparent resin material, the aforementioned can be recognized at any portion of the pipe.

Accordingly, without requiring any other steps, it is possible to very easily obtain a reinforcing-thread-buried resin pipe in which the required identification can be made over the whole length of the pipe, because it is only necessary to make a part of the reinforcing threads different in color from the remaining reinforcing threads, or to simultaneously provide the filaments different in color from the reinforcing threads when the threads are disposed at the production of the pipe.

DETAILED DESCRIPTION OF THE INVENTION

Figure 1:
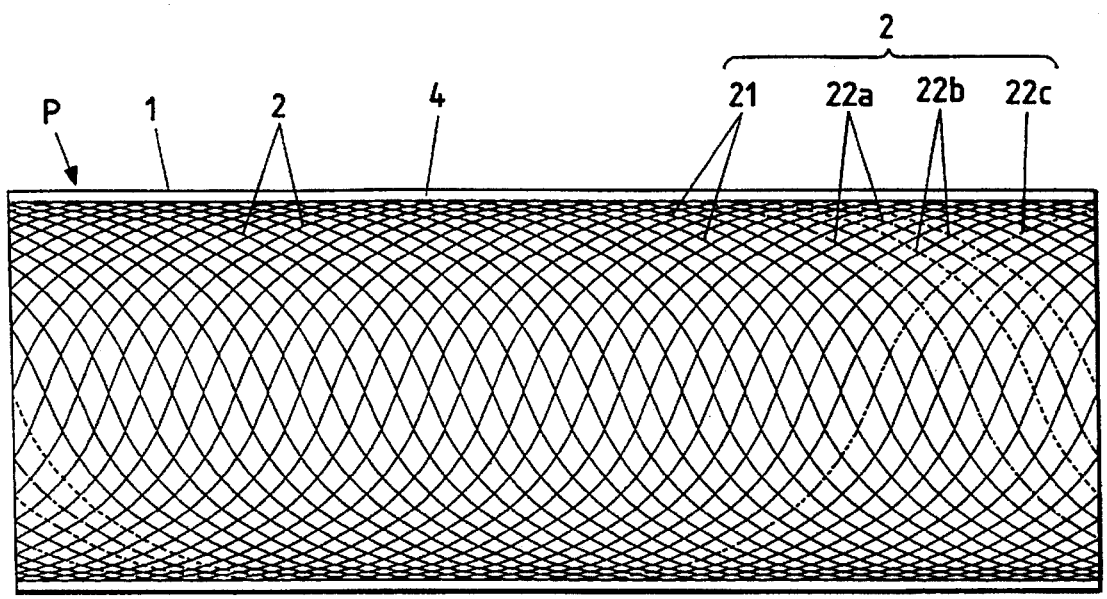
FIG. 1 is a front view of a pipe body showing a first embodiment of the present invention.
Figure 2:
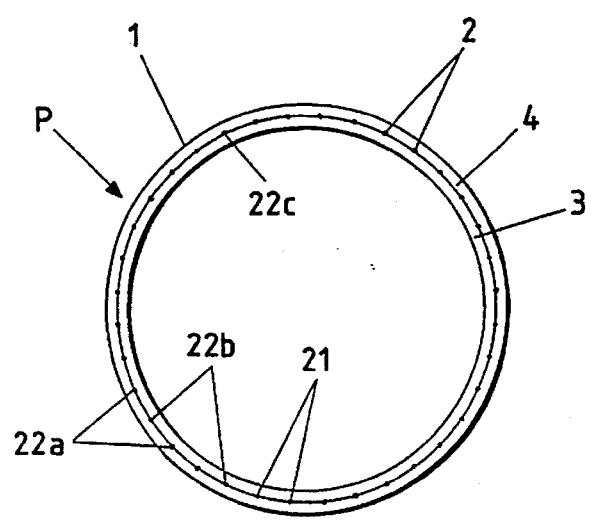
FIG. 2 is a sectional view of the end surface of the pipe of FIG. 1.
Figure 3:
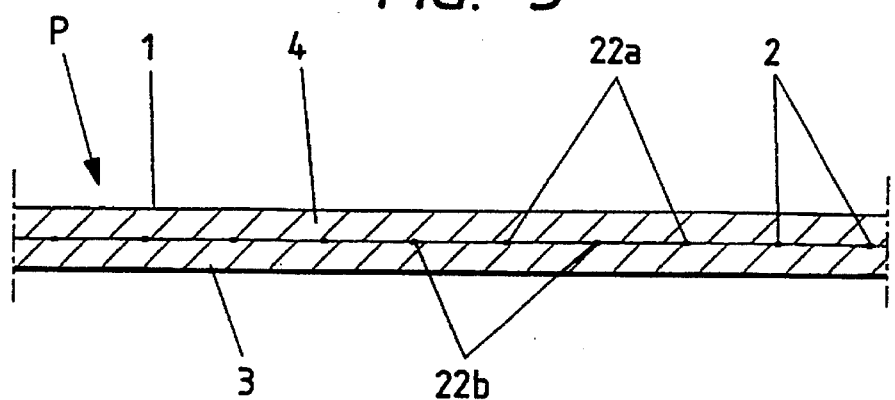
FIG. 3 is an enlarged sectional view of the pipe wall portion of the pipe of FIG. 1.

Referring to the accompanying drawings, embodiments of the present invention will be described below. FIGS. 1 through 3 show a first embodiment of the present invention. FIG. 1 shows the external appearance of a pipe P, FIG. 2 shows a cross section of the pipe P, and FIG. 3 is an enlarged sectional view of a part of the pipe wall 1 cut off along the direction of the axis of the pipe.

The pipe body P shown in the embodiment is a pipe having a pipe wall 1 formed of a synthetic resin material. As seen in FIGS. 2 and 3, the pipe wall 1 has a structure in which an inner layer 3 is formed cylindrically from a soft PVC material, a number of reinforcing threads 2 are arranged on the outer circumferential surface of the inner layer 3 such that one part of the reinforcing threads 2 are arranged in a predetermined spiral direction and other part of the reinforcing threads 2 are arranged in a spiral direction opposite to the predetermined spiral direction (that is, one being made to be lower threads and the other being made to be upper threads) so as to cross each other, an outer layer 4 is formed cylindrically from a transparent soft PVC material on the outer circumferential surface of the thread arrangement of the reinforcing threads 2, and the inner layer 3 and outer layer 4 are bonded integrally with each other to form a cylindrical pipe.

A representative one of means for producing the pipe body P having such a structure as mentioned above is such that the cylindrical inner layer 3 is formed by known means in which a soft PVC belt-like material formed through extrusion into a flat belt-like form is wound spirally on a circumferential surface of a pipe forming shaft not shown in the drawing while side edge portions of the flat belt-like material are overlapped on each other and the overlapped portions are fused with each other or bonded with each other with an adhesive agent, a number of reinforcing threads 2 are arranged by a known thread arrangement apparatus on the outer circumferential surface of the inner layer 3 during formation of the inner layer 3, and another transparent soft PVC belt-like material is wound on the outer circumferential surface of the thread-arrangement of the reinforcing threads 2 to thereby form the outer layer 4 similarly to the inner layer 3.

Another representative producing means is such that a resin material is extruded cylindrically from a first resin extruder onto a pipe forming shaft to form the inner layer 3, a number of reinforcing threads 2 are arranged on the outer circumferential surface of the inner layer 3, and a transparent resin material is extruded cylindrically from a second resin extruder onto the outer circumferential surface of the arrangement of the reinforcing threads 2 to form the outer layer 4.

When the pipe is formed, as shown with a broken line in FIG. 1, some reinforcing threads different in color from the general reinforcing threads 21 are used as a part of a number of reinforcing threads 2. In the embodiment shown in FIG. 1, two colored reinforcing threads 22a indicated by a one-dotted chain line, two colored reinforcing threads 22b indicated by a dotted line, and one colored reinforcing thread 22c indicated by a two-dotted chain line, that is, five colored reinforcing threads 22 of three colors in total, are used. The colored reinforcing threads 22a indicated by a one-dotted chain line are arranged in parallel with two reinforcing threads disposed therebetween, the colored reinforcing threads 22b indicated by a dotted line are arranged in parallel with a one-dotted chain line reinforcing thread 22a disposed therebetween, and the colored reinforcing thread 22c indicated by a two-dotted chain line is arranged in the reverse spiral direction so as to intersect those reinforcing threads 22a and 22b.

In this manner, at the time of arrangement of threads, reinforcing threads different in color from the general reinforcing threads 21 are included in the reinforcing threads 2 as a part thereof. At this time, selected colors of threads and intervals of thread arrangement are combined variously and suitably to thereby make it possible to perform necessary identification with respect to the source of the pipe body, date of production of the pipe body, etc.

Since the outer layer 4 is formed of a transparent resin material as described above, the pipe P of this embodiment has an advantage that the colors of reinforcing threads 2, the intervals of thread arrangement of the reinforcing threads 2, and the combination thereof can be recognized at any position of the pipe body without depending only on the appearance on the pipe end.

Figure 4:
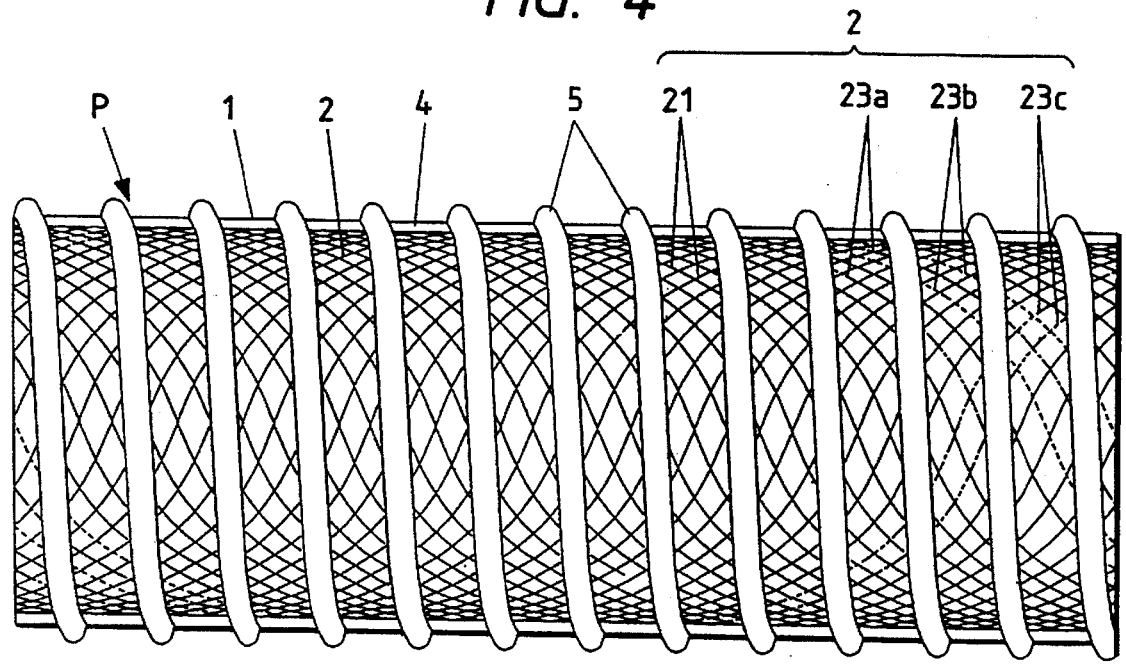
FIG. 4 is a front view of a pipe body showing a second embodiment of the present invention.
Figure 5:
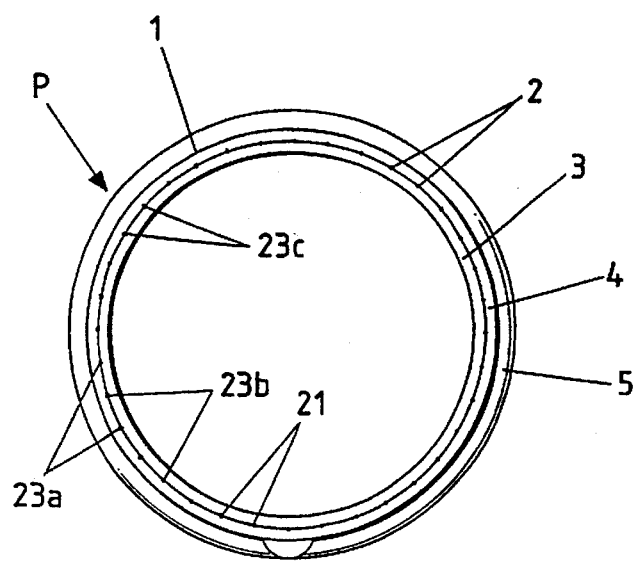
FIG. 5 is a sectional view of the end surface of the pipe of FIG. 4.

The pipe P illustrated in FIGS. 4 and 5 is a pipe shown as a second embodiment of the present invention. The pipe P of this embodiment is a pipe with a hard resin reinforcing wire in which a hard resin reinforcing wire 5 is spirally wound on and integrated with the outer circumferential surface of the cylindrical pipe body in which reinforcing threads 2 are buried between inner and outer layers 3 and 4 similar to that shown in the aforementioned first embodiment.

The thread arrangement in this pipe P is such that the reinforcing threads 2 per se are not changed in color but other threads different in color are added to the reinforcing threads 2 and the reinforcing threads 2 and the additional reinforcing threads are buried simultaneously to thereby make it possible to perform identification. The reinforcing threads 2 illustrated in this embodiment include two colored additional reinforcing threads 23a as indicated by a one-dotted chain line, two colored additional reinforcing threads 23b as indicated by a dotted line, and two colored additional reinforcing threads 23c as indicated by a two-dotted chain line. The colored additional reinforcing threads 23a indicated by a one-dotted chain line and the colored additional reinforcing threads 23b indicated by a dotted line are arranged in directions parallel to each other, while the colored additional reinforcing threads 23c indicated by a two-dotted chain line are arranged in the reversely spiral direction so as to intersect the reinforcing threads 23a and 23b.

The number of the reinforcing threads 2 to be used may be changed suitably in accordance with the diameter of the pipe, the material of the pipe, the thickness of the pipe, the required property of pressure resistance, or the like. In the case of pipes having an inner diameter of 25 mm, 32 mm and 38 mm, for example, the number of the reinforcing threads 2 to be used in one direction is selected to be 15, 18 and 20, respectively.

In the case where, of those reinforcing threads 2, only one kind of identification threads 22 and 23 are used, it is only necessary that, for example, the lower threads indicate the year of production and the upper threads indicate the month of production. More specifically, as the indication of the year of production, it is only necessary to indicate the last digit of A.D., and as the indication of the month of production, it is only necessary to indicate one of the numerals from 1 to 12. In the case where two or three identification threads of one kind are used for indication of each of the year and month, for example, it is possible to carry out the indication in such a manner that the numeral "1" is indicated if the two identification threads are adjacent to each other, each of the numerals "2" to "6" is indicated by "N+1" if there are provided N general reinforcing thread/reinforcing threads between the two identification threads, while each of the numerals "7" to "12" is indicated by additionally arranging a third identification thread adjacently to either one of the above-mentioned two identification threads in addition to the above-mentioned manner for indicating each of the numerical values "1" to "6". According to this method, it is necessary only to use identification threads of one kind. If the number of colors of the identification threads is increased, however, it becomes possible to indicate also the week of production, the part of the month of production, and the day of production.

Figure 6:
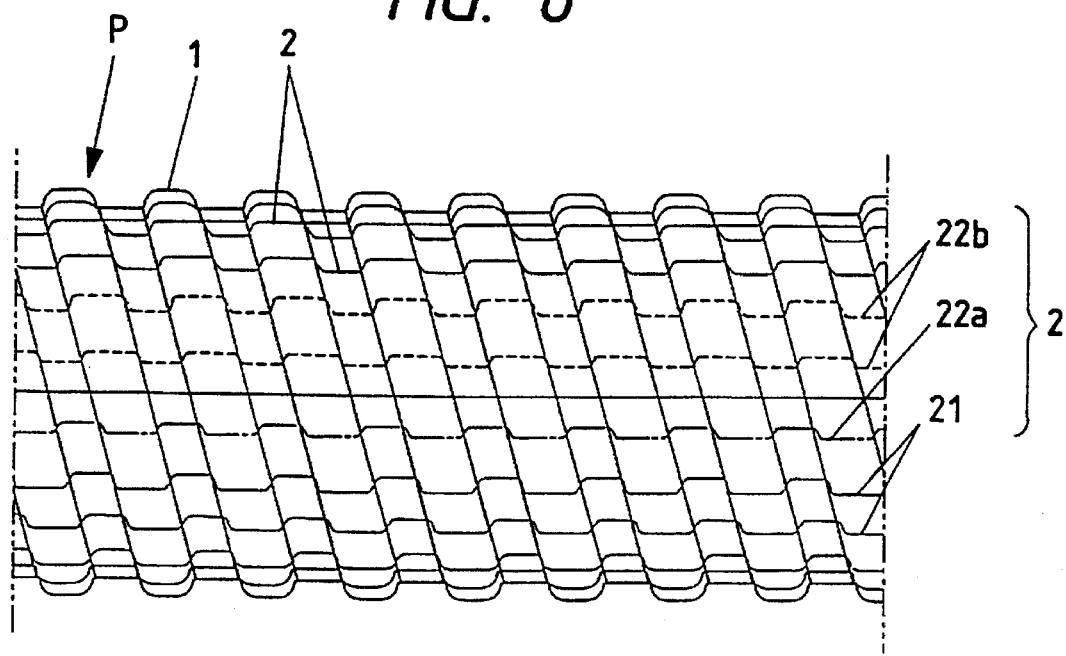
FIG. 6 is a front view of a pipe body showing a third embodiment of the present invention.
Figure 7:
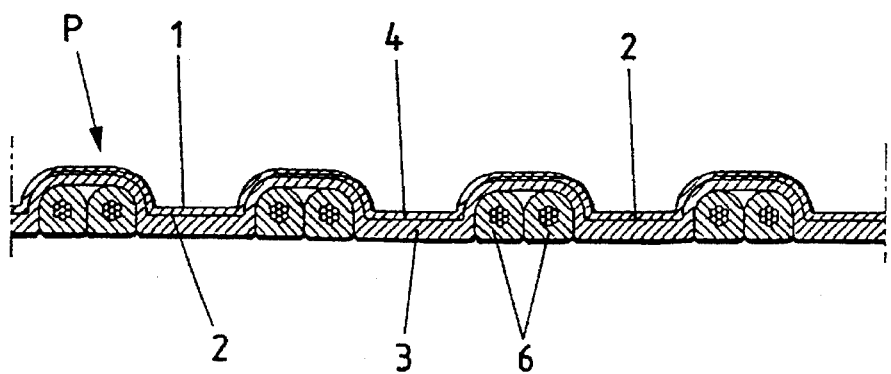
FIG. 7 is an enlarged sectional view of the pipe wall portion of the pipe of FIG. 6.

Although each of the first and second embodiments is shown with respect to the pipe P in which the reinforcing threads 2 are arranged in the forward and reverse spiral directions so as to cross each other, the direction of the reinforcing threads arrangement is not limited to this arrangement in crossing directions but the reinforcing threads may be arranged in the direction along the axis line of the pipe body. In a third embodiment illustrated in FIGS. 6 and 7, a pipe having such a thread arrangement is shown. As seen in FIG. 7, the pipe P of this embodiment is a pipe having a structure which is suitable for use as a hose of a cleaner and in which a resin-coated electric wire 6 is spirally wound on the inner surface of the pipe body. Further, in the pipe P, a number of reinforcing threads are arranged between an inner layer 3 and an outer layer 4 of a pipe wall 1 along the direction of axial line of the pipe and at predetermined intervals in the circumferential direction of the pipe.

The reinforcing threads 2 of this embodiment include, in addition to general reinforcing threads 21, one colored reinforcing thread 22a indicated by a one-dotted chain line and two colored reinforcing threads 22b indicated by a dotted line, that is, three additional colored reinforcing threads of two kinds in total. The colored reinforcing thread 22a indicated by a one-dotted chain line and the colored reinforcing threads 22b indicated by a dotted line are arranged with one general reinforcing thread 21 interposed therebetween, while the two colored reinforcing threads 22b indicated by a dotted line are arranged adjacently to each other.

In this embodiment, for example, it is possible to indicate the year of production by the color of the one identification reinforcing thread 22a indicated by a one-dotted chain line and it is possible to recognize the month of production by the two identification reinforcing threads 22b indicated by a dotted line. In this case, the numeral of each of "1" to "6" is indicated by the interval between the two identification reinforcing threads 22b as described above, while the numeral of each of "7" to "12" is indicated by changing the interval between the two identification reinforcing threads 22b and the identification reinforcing thread 22a indicated by a one-dotted chain line. In this manner, it is possible to recognize the year and month of production by three identification threads.

Although description has been made above about a pipe in which, in order to indicate the state of thread arrangement, the state of thread arrangement can be recognized from the outside of the pipe, the resin material used to form the pipe wall 1 is not necessarily a transparent material but may be an opaque material as described above. In the case where the pipe wall 1 is formed from an opaque material, the recognition can be made easily from a cut-off sectional end surface of the pipe.

Although description has been made above about the representative embodiments of the present invention, the present invention is not always limited to the structures of those embodiments, but can be carried out with suitable modifications within a range where all the constituent features of the present invention are provided, the above object of the present invention can be achieved, and the following effects can be attained.

As apparent from the description made above, the present invention provides, in a pipe having a number of reinforcing threads buried in its pipe wall, a configuration in which, by using means for burying those reinforcing threads, one or more reinforcing threads or filaments different in color from the above-mentioned reinforcing threads are mixed into the those reinforcing threads. Accordingly, in those reinforcing threads or filaments different in color, if not only the color but also the thread arrangement interval are suitably set, it is possible, by the combination of the color and the thread arrangement interval, to obtain a very remarkable effect that the source of the pipe body, the date of production of the pipe body, etc., can be recognized by the inspection of the color of the reinforcing threads or filaments, the order of thread arrangement of the reinforcing threads or filaments, and the positional relation in thread arrangement of the reinforcing threads or filaments with respect to the general reinforcing threads which appear in the sectional end surface of the pipe over the entire length of the pipe body.

Further, in spite of such a configuration of the pipe, it is only necessary, at the time of production of the pipe, that a part of the reinforcing threads be changed into other reinforcing threads different in color from the former or filaments different in color from the reinforcing threads are arranged simultaneously with the former when the thread arrangement is carried out. Accordingly, it is possible to obtain another effect, in addition to the above effect, that such a pipe body can be obtained very easily without requiring any other step and without bringing about any increase in cost.

What is claimed is:

1. A reinforcing-thread-buried resin pipe, comprising:

a pipe wall comprising a resin material having a plurality of layers; and a plurality of reinforcing threads positioned between said layers;

wherein said reinforcing threads include first reinforcing threads having a first color and at least one second reinforcing thread having at least one second color, said second color being different than said first color, wherein said second color indicates a characteristic of said pipe.

2. A reinforcing-thread-buried resin pipe, comprising:

a pipe wall comprising a resin material having a plurality of layers; and a plurality of reinforcing threads, positioned between said layers, having a first color;

said reinforcing threads including at least one filament having at least one second color different than said first color, wherein said second color indicates a characteristic of said pipe.

3. A reinforcing-thread-buried resin pipe according to claim 1, wherein said second reinforcing thread comprises at least two of said reinforcing threads and said second color comprises at least two of said second colors.

4. A reinforcing-thread-buried resin pipe according to claim 2, wherein said filament comprises at least two filaments and said second color comprises at least two of said second colors.

5. A reinforcing-thread-buried resin pipe according to claim 1, wherein said layers include an outer layer covering an outer circumferential surface of said reinforcing threads, said outer layer comprising transparent resin, wherein said reinforcing threads are visible through said transparent resin.

6. A reinforcing-thread-buried resin pipe according to claim 2, wherein said layers include an outer layer covering an outer circumferential surface of said reinforcing threads, said outer layer comprising transparent resin, wherein said reinforcing threads are visible through said transparent resin.

7. A reinforcing-thread-buried resin pipe according to claim 3, wherein said layers include an outer layer covering an outer circumferential surface of said reinforcing threads, said outer layer comprising transparent resin, wherein said reinforcing threads are visible through said transparent resin.

8. A reinforcing-thread-buried resin pipe according to claim 4, wherein said layers include an outer layer covering an outer circumferential surface of said reinforcing threads, said outer layer comprising transparent resin, wherein said reinforcing threads are visible through said transparent resin.

9. A reinforcing-thread-buried resin pipe according to claim 1, wherein said pipe wall has a cylindrical shape.

10. A reinforcing-thread-buried resin pipe according to claim 1, wherein said pipe wall has a corrugated shape.

11. A reinforcing-thread-buried resin pipe according to claim 1, wherein said pipe wall has an inner circumferential surface having a cylindrical shape, and an outer circumferential surface having a corrugated shape.

12. A reinforcing-thread-buried resin pipe according to claim 1, wherein said resin material comprises rubber.

13. A reinforcing-threaded-buried resin pipe according to claim 1, further comprising a resin reinforcing wire positioned spirally on and integrated with an outer circumferential surface of said pipe wall.

14. A reinforcing-thread-buried resin pipe according to claim 2, wherein said resin material comprises rubber.

15. A reinforcing-threaded-buried resin pipe according to claim 2, further comprising a resin reinforcing wire positioned spirally on and integrated with an outer circumferential surface of said pipe wall.

16. A reinforcing-thread-buried resin pipe as in claim 1, wherein said reinforcing threads extend continuously along an entire length of said pipe.

17. A reinforcing-thread-buried resin pipe as in claim 2, wherein said reinforcing threads extend continuously along an entire length of said pipe.

18. A reinforcing-thread-buried resin pipe as in claim 1, wherein said second reinforcing thread comprises a plurality of second reinforcing threads having different colors, said first reinforcing threads and said second reinforcing threads comprising a pattern on said pipe wall, said pattern indicating said characteristic of said pipe.

19. A reinforcing-thread-buried resin pipe as in claim 18, wherein said first reinforcing threads and said second reinforcing threads have a spacing therebetween, said spacing comprises coded information of said characteristic of said pipe.

20. A reinforcing-thread-buried resin pipe as in claim 18, wherein said second reinforcing threads comprise a pattern of colors, said pattern comprising coded information of said characteristic of said pipe.

* * * * *